United States Patent
Hütten et al.

(10) Patent No.: US 9,148,084 B2
(45) Date of Patent: Sep. 29, 2015

(54) MACHINE HAVING A CONVERTER CONTROLLED DRIVE

(71) Applicant: SIEMENS AKTIENGESELLSCHAFT, München (DE)

(72) Inventors: Volker Hütten, Moers (DE); Norbert Wagner, Bottrop (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1 day.

(21) Appl. No.: 14/220,844

(22) Filed: Mar. 20, 2014

(65) Prior Publication Data

US 2014/0203744 A1 Jul. 24, 2014

Related U.S. Application Data

(63) Continuation of application No. 13/636,179, filed as application No. PCT/EP2011/054366 on Mar. 22, 2011, now Pat. No. 8,680,793.

(30) Foreign Application Priority Data

Mar. 22, 2010 (DE) .......................... 10 2010 012 268
Mar. 21, 2011 (WO) .................. PCT/EP2011/054225

(51) Int. Cl.
| H02P 27/04 | (2006.01) |
| H02P 23/04 | (2006.01) |
| F01D 5/02 | (2006.01) |
| H02P 5/74 | (2006.01) |
| H02P 6/10 | (2006.01) |

(52) U.S. Cl.
CPC ........ *H02P 27/04* (2013.01); *F01D 5/02* (2013.01); *H02P 5/74* (2013.01); *H02P 6/10* (2013.01); *H02P 23/04* (2013.01)

(58) Field of Classification Search
CPC .................................. H02P 27/04; H02P 6/10
USPC ...................................................... 318/400.23
See application file for complete search history.

(56) References Cited

U.S. PATENT DOCUMENTS 4,538,100 A * 8/1985 Tuten et al. .................... 318/808
5,635,811 A * 6/1997 Rebhan et al. ................. 318/778

FOREIGN PATENT DOCUMENTS

| CN | 1032586 A | 4/1989 |
| CN | 2844992 Y | 12/2006 |
| JP | 200174547 A | 3/2001 |
| JP | 2006144575 A | 6/2006 |

OTHER PUBLICATIONS

Schramm et al;"Damping torsional interharmonic effects of large drives"; Power Electronics and Motion Control Conference,IPEMC '09, IEEE 6th International, IEEE; pp. 484-490;ISBN; 978-1-4244-3556-2 XP031535158; 2009; May 17, 2009.

* cited by examiner

*Primary Examiner* — David S Luo

(57) ABSTRACT

A with a converter controlled drive includes a rotor, a drive having a variable rotational frequency a working machine and a frequency converter. The drive and the working machine are connected to one another such that a torque is transmitted. The frequency converter is electrically connected to the drive and converts input frequencies to output frequencies. The output frequencies are grouped into a plurality of concentration ranges based upon a rotational speed of the machine. Each concentration range defines a blocking range. The machine has an operating rotational speed range which lies outside the blocking ranges.

15 Claims, 3 Drawing Sheets

MACHINE HAVING A CONVERTER CONTROLLED DRIVE

CROSS REFERENCE TO RELATED APPLICATIONS

This application is a continuation of U.S. patent application Ser. No. 13/636,179, filed on Nov. 27, 2012, and claims the benefit thereof under 35 U.S.C. §120. The U.S. patent application Ser. No. 13/636,179US is the National Stage of International Application No. PCT/EP2011/054366 filed Mar. 22, 2011, and claims the benefit thereof. The International Application claims the benefits of German Patent Application No. 10 2010 012 268.8 DE filed Mar. 22, 2010, and International Application No. PCT/EP2011/054225 filed Mar. 21, 2011. All of the applications are incorporated by reference herein in their entirety.

FIELD OF INVENTION

The invention relates to rotary machines, particularly to a machine having a converter-controlled drive with a variable rotational frequency.

BACKGROUND OF INVENTION

Such machines have at least one rotor and can also comprise a plurality of rotors which can also be components of an intermediately arranged transmission. If there is a plurality of rotors, the invention can be applied to each individual. When there is a single rotor, the drive rotor is permanently connected to the working machine rotor along a common rotational axis to form a shaft line.

An exemplary field of application of the invention is the power range of at least 1MW absorption power which differs basically in terms of the dimensions, the selection of materials and the use of significantly smaller assemblies.

As a result of the rectifying and, in the next step, the inversion within the converter to the output frequency or the desired working frequency, not only the working frequency but also harmonic and inter-harmonic frequency components are generated in the electrical feed signal of the motor.

If the Fourier analysis (rapid Fourier transmission) is also used, inter alia, to determine frequency components which are not integral multiples of the frequency of the feed signal, these components are referred to as inter-harmonics.

These harmonic and inter-harmonic frequencies in the electrical feed signal of the motor are applied to the mechanical system in the air gap of the motor as exciting torsional moments.

A Campbell diagram permits the running performance of a machine in a rotational speed range to be assessed through this synopsis of the rotational speed, exciter frequencies and natural frequencies. The X axis of the Campbell diagram or the abscissa represents rotational speed of the rotor of the machine under consideration. If an oscillation profile which is dependent on the rotational speed, for example a torsional oscillation of a rotor shaft, is transformed from the time domain to the frequency domain by means of Fourier transformation, these are represented in the Campbell diagram as a rising and a falling straight line plotted against the X axis, wherein the latter represent the rotational speed of the rotor. Orders (O1, O2, . . . ) of the Fourier transformation are then reflected in these straight lines which appear as center point beams and whose gradient is proportional to the respective ordinal number. The frequency f of the natural frequency of the rotor or the rotating part which is subjected to consideration is represented on the ordinate. The natural frequencies are represented as a tolerance band whose respective width arises as a result of the inaccuracy of the model formation and, if appropriate, other variants. As a result, the natural torsional frequency relates, unless stated otherwise, to the described tolerance band in all cases. The bandwidth of the tolerance band is already obtained from irregularities of the geometry due to unavoidable fabrication tolerances. A tolerance band is, for example, assumed to be wide here such that a calculation directly includes various embodiments of the machine, with the result that these variants are also covered by the dimensions. Accordingly, the tolerance band can, for example, have a certain lack of precision.

In addition, harmonic exciter frequencies are represented, which are represented as straight lines parallel to the abscissa if they are independent of the rotational speed. If the exciter frequency varies with the rotational speed, said frequency is represented as a rising or falling straight line through the origin. If the rotational speed of the machine is in a range in which the exciter frequency profiles intersect the tolerance band of natural frequencies, increased oscillation altitudes are to be expected.

Inter-harmonic exciter frequencies occur as V-shaped, symmetrical beams for output frequencies F1, F2, F3, . . . ; Fn in the Campbell diagram. Wherein F1, . . . Fi, . . . Fn are grouped into concentration ranges G1, . . . , Gi, . . . Gz, wherein Fi which are close to one another and which together form a common output point are combined in Gi.

The upper and lower limits of the concentration range G1, . . . , Gi, . . . Gz are defined by the intersection point of the lowest natural torsional frequency of the rotor with the two straight lines of the beam pair of the inter-harmonics of the first order of the respective concentration range G1, . . . , Gi, . . . Gz. The intersection point in the case of inter-harmonics always denotes the coordinates with the highest frequency with respect to the range of the tolerance band which is intersected by the inter-harmonics. Insofar as an excitation of the second and/or third natural torsional frequency is mechanically possible, this is to be taken into account in the same way (mutatis mutandis) as described above for the first natural torsional frequency.

If the harmonic and inter-harmonic exciter frequencies are represented together with the natural torsional frequencies of the mechanical system in a Campbell diagram (exciter or natural frequencies plotted against the rotational speed of the motor), it is seen that in the operational range of conventionally configured motors, intersection points of the natural torsional frequency which can be excited by the motor (usually the first natural torsional frequency) with the inter-harmonic exciter frequencies occur. A steady-state operation of the mechanical system at one of these intersection points of inter-harmonic excitation and natural torsional frequency leads to a state of resonance with high torsional oscillation amplitudes and therefore to high dynamic torsional stresses in the torque-transmitting line components. The consequences which possibly result from this, for example fatigue damage to the load of the line components, should be avoided.

Drives with converter-controlled electric motors have as a rule a frequency converter and an electrical synchronous motor or asynchronous motor. While the input frequency into the converter is embodied as a pure sinusoidal oscillation on the basis of the virtually perfect rotational movement of the energy generation assemblies which feed the power system frequency, the spectrum of the frequency analysis shows that the output from the converter has, in addition to the set point frequency, other frequencies which can lead to excitations of torsional oscillations. Such undesired secondary frequencies, which have been virtually impossible to avoid hitherto, are also referred to as harmonic or inter-harmonic exciter frequencies. The inter-harmonic exciter frequencies within the customary operating rotational speed range of the motor usually give rise to excitation of torsional oscillations of the entire drive, for example driven compressor trains or other turbo sets.

Insofar as there is no intermediate transmission in the mechanical train, the additional loading, caused by the excited torsional oscillation, can occur largely unnoticed. However, the undesired dynamic additional loading in the mechanical line components give rise to a considerably shortened service life owing to fatigue of components.

If a transmission is a component of the machine, within the transmission toothed engagement occurs to form a coupling between torsional oscillations and radial oscillations. As a result, the torsional oscillations in the transmission also have the effect of shortening the service life. In addition, undesired large radial oscillations and undesired increased noise emission (rattling of the transmission) occur.

The problem of undesired torsional oscillations can be frequently detected only by means of a dynamic measurement of the torsional moment. Such a measurement is usually not used for continuously monitoring a turbo line, and would only identify torsional resonances which are present but would not avoid the cause of their generation.

SUMMARY OF INVENTION

It is desirable to improve the smooth running of machines with converter-controlled drives and of avoiding the possible consequences of large oscillations, for example fatigue damage, as a result.

The above may be achieved by the features of the independent claim(s).

An operating rotational speed range specifies here the range of the rotational speed of a rotor which is used as the basis for the configuration of the machine and in which the rotational speed is located during at least 90% of the assumed operating period.

One embodiment of the invention provides that the converter-controlled drive has a number of pole pairs which, in conjunction with a predetermined motor feed frequency operating range of the converter, defines a motor feed frequency and/or an operating rotational speed range, lying outside the concentration ranges G1 to Gz.

An exemplary field of application of the invention includes machines which are embodied as a turbo set, in particular machines which have at least one turbo compressor. The currently customary selection of the drive has the effect that the concentration ranges G1, . . . Gz give rise to intersection points with the natural torsional frequency in the driving range and therefore large torsional loadings of the line components. Insofar as the torque is transmitted from a converter-controlled drive to the working machine, it is possible, given knowledge of the inter-harmonic torsional excitations, to avoid torsional resonance states in the operating rotational speed range of the drive through a targeted selection of the number (PPZ) of pole pairs of the drive. In this way, the motor avoids the natural inter-harmonic exciter frequency of the converter by shifting the operational rotational speed range to a lower or higher rotational speed range. When a transmission is used, further resonance-free operating rotational speed ranges which arise can be used to selectively adjust the transmission ratio. For example it may be expedient here if the transmission adjusts the rotational speed of the converter-controlled drive to a relatively high rotational speed at the working machine. In particular, a number of pole pairs of >2 of the converter-controlled drive in combination with a transmission, which transmits to a relatively high rotational speed, for the working machine can implement the inventions if at least one concentration range lies in the region of the input frequency into the converter, which is relatively frequently the case. In this way, the motor avoids the inter-harmonic exciter frequency of the converter in the direction of a relatively low rotational speed, and the transmission adjusts this relatively low rotational speed to the desired rotational speed of the working machine or into a corresponding operating rotational speed range.

Insofar as the second and/or third natural torsional frequency is mechanically possible, it should be taken into account in the same way (mutatis mutandis) as described above for the first natural torsional frequency.

As a result, a specific exemplary embodiment is described, wherein this serves merely to illustrate the invention and other possibilities for implementing the invention are conceivable to a person skilled in the art, in particular by means of any desired combination of the features defined in the claims.

DETAILED DESCRIPTION OF INVENTION

Figure 1:
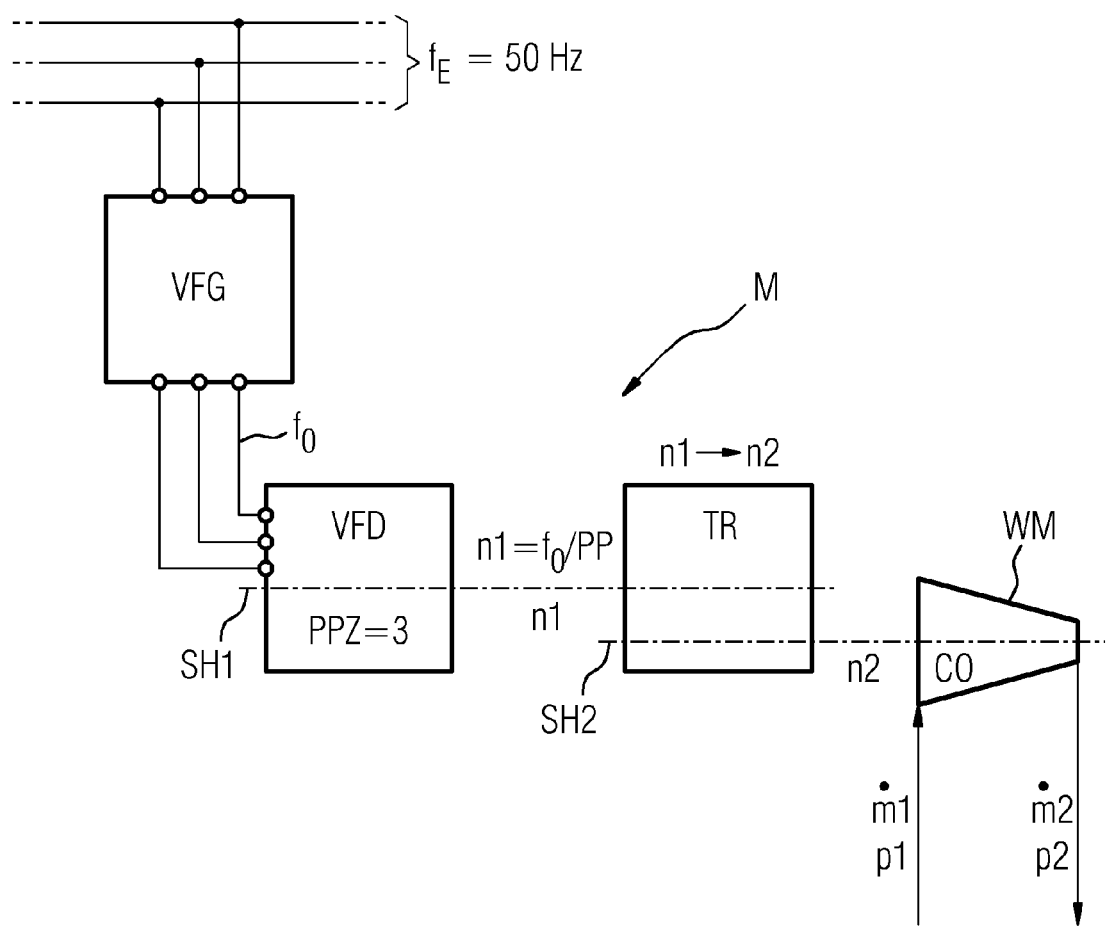
FIG. 1 shows a simplified illustration of a machine according to the invention.

FIG. 1 is a schematic view of a machine M according to the invention. Significant components of the machine M according to the invention are the (frequency) converter VFG, a converter-controlled drive VFD with a variable rotational speed $n_1$, and a working machine WM, which is embodied here as a compressor CO. The exemplary embodiment furthermore also comprises a transmission TR, which converts the rotational speed generated by the drive VFD at a first shaft SH1 to a second rotational speed n2 at a second shaft SH2, which drives the compressor CO. The compressor CO conveys a mass flow M1 from a first pressure P1 to a higher second pressure P2. The converter VFG generates, from the power system frequency of, for example, 50 Hz (input frequency fE), an output frequency f0, with which the drive is fed. The drive VFD rotates as a function of the output f0 from the converter VFG and as a function of the number of pole pairs (NPP=number of pole pairs) with the rotational speed n1. The rotational speed n1 corresponds here to the quotient from the output frequency f0 from the converter VFG and the number of pole pairs NPP. The arrangement composed of the drive VFD, the first shaft SH1, the transmission TR, the second shaft SH2 and the working machine WM has, with respect to the shafts, natural torsional frequencies FT1, FT2, FTi, with the result that high oscillation amplitudes can occur during operation in the vicinity of these frequencies. Furthermore, as a result of the torsional bending oscillation coupling, in particular in intermediate transmissions, radial oscillations can also be excited by torsional oscillations. The converter VFG is a current intermediate-circuit converter (LCI). Alternatively, the converter can also be a voltage converter.

As already explained at the beginning, the output frequency f0 which is generated by the converter VFG can be represented as a pure sinusoidal oscillation with a set point frequency on which further components of harmonic and inter-harmonic oscillations with a different frequency are superimposed.

Figure 2:
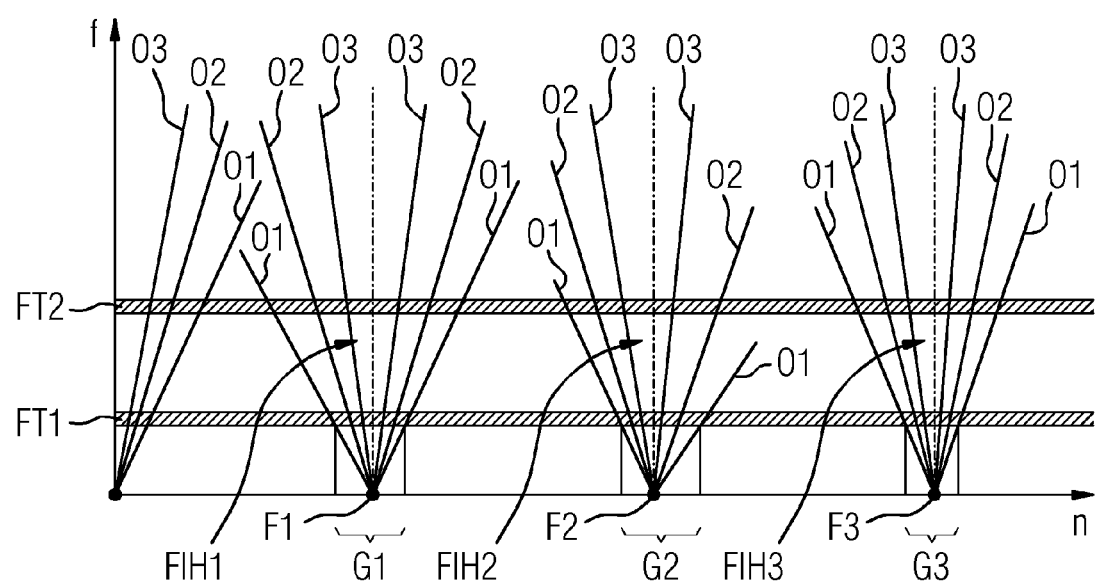
FIG. 2 shows a Campbell diagram, characteristic of the converter illustrated by way of example in FIG. 1.

FIG. 2 shows in this respect a schematic illustration of the Campbell diagram, which represents these so-called inter-harmonic exciter frequencies of the converter output. These exciter frequencies are generated in the converter and transmit as a torque fluctuation in the motor, via the air gap between the stator and rotor, to the mechanical system.

The Campbell diagram is used in all fields of oscillation technology, for example for representing oscillations of rotors and blades. The diagram is suitable for assessing the oscillation adjustment, for example in the entire operating rotational speed range, and for identifying possible resonance states.

Natural frequencies can also be represented as a frequency band whose width results from the variance of calculation models. In addition to the harmonic exciter frequencies, there are also spectral components for this type of application case, which components are referred to as inter-harmonic exciter frequencies. In the Campbell diagram in FIGS. 2 and 3, the inter-harmonic exciter frequencies FIH1, FIH2, FIH3 are each represented as straight lines which each have a symmetrical partner, which straight line partner has the same gradient value with a different sign. On the abscissa of the Campbell diagram, the straight lines, which indicate the dependence of the inter-harmonic exciter frequencies with respect to the drive rotational speed, intersect. In addition to the harmonic exciter frequencies, which are represented in the Campbell diagram in FIG. 2 as a group of straight lines through the zero point of the diagram, FIG. 2 shows by way of example three straight line groups which indicate inter-harmonic exciter frequencies as function of the drive rotational speed, said frequencies each having a starting point on the abscissa.

Figure 3:
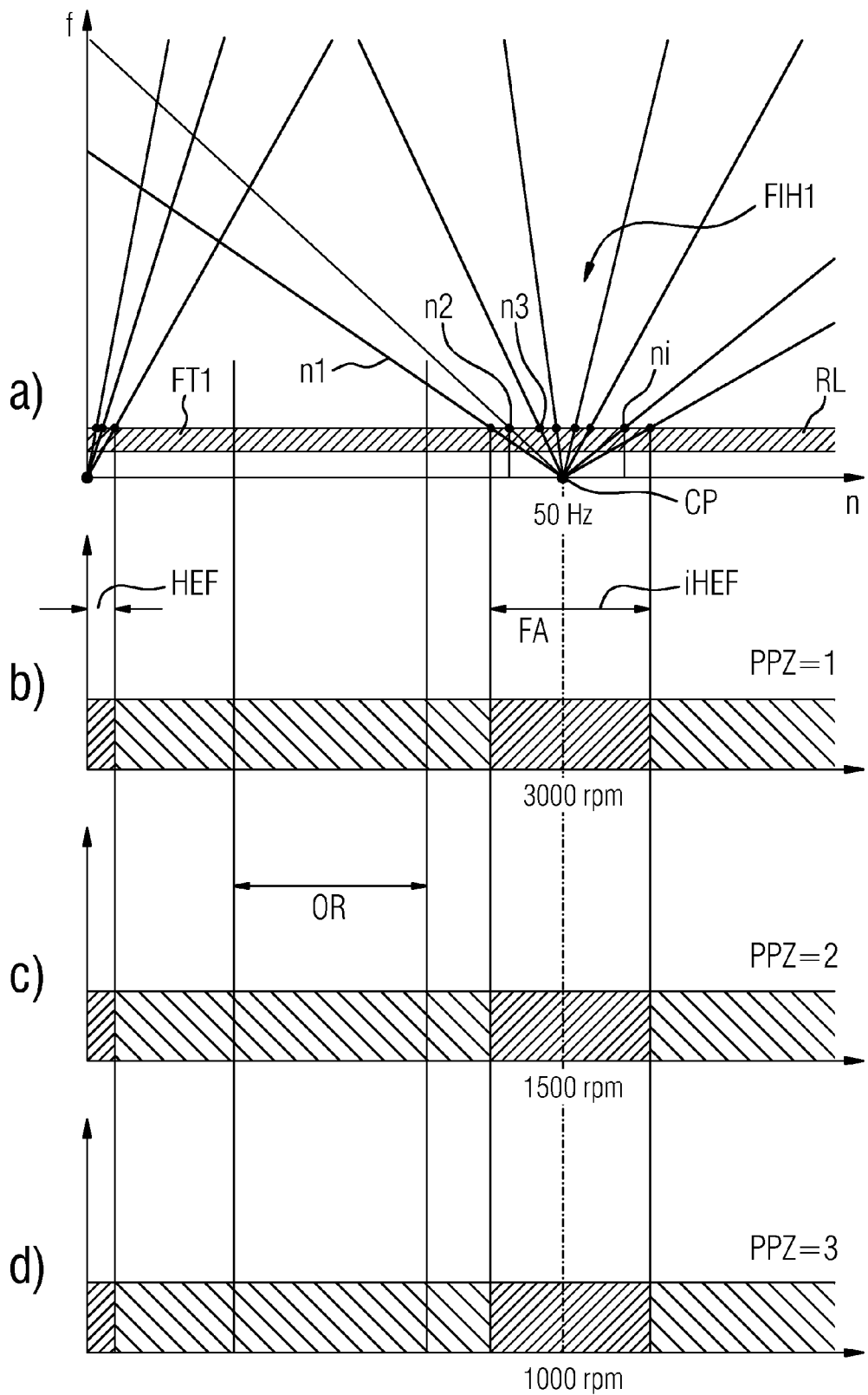
FIG. 3 shows a detail of the Campbell diagram in FIG. 2 and the implementation possibilities with respect to the operating rotational speed range of the machine.

In FIG. 3, the case of various numbers of pole pairs for the drive (NPP=1, 2, 3) is shown. In the upper diagram, typical natural torsional frequencies of possible turbo compressor trains with a certain width corresponding to the variance are shown as a horizontal line. The harmonic and inter-harmonic frequency profiles corresponding to the straight line through the origin or through the first concentration point CP are generated by the converter. The intersection points of the straight lines (shown here by way of example only as an intersection point of the upper limit of the natural torsional frequency range) with the natural torsional frequency band RL of the compressor train result in rotational frequencies n1, . . . ,ni, which are grouped around the concentration point CP. The range FA which is defined by the outer elements of the grouping is not part of the aimed-resonance-free operating rotational speed range of the range OR, entered as an example, of the machine M. The operating rotational speed range OR which is shown is arranged here, for example, between the spanned blocking ranges of the harmonic exciter frequencies HEF at a low rotational speed and the blocking range FA which is spanned by the inter-harmonic exciter frequencies iHEF. The operating rotational speed range OR is shown here by way of example and can, of course, be positioned in all the possible resonance-free rotational speed ranges, therefore also above the concentration range shown here. According to the invention, the output frequency FO of the converter can be selected in combination with the number of pole pairs NPP of the drive VFD in such a way that no significant torsional excitations due to inter-harmonic exciter frequencies occur within the desired operating rotational speed range. The position of the inter-harmonic exciter frequencies is dependent on the characteristic and the input frequency (power system frequency) FE into the converter VFG. With the number of pole pairs NPP, the position of the operating rotational speed range OR with respect to the blocking range FA which is spanned by the inter-harmonic exciter frequencies can be determined. As illustrated in the example diagram c), a number of pole pairs NPP=2 can shift the blocking range about a concentration point CP about 1500 RPM instead of about 3000 RPM given a number of pole pairs NPP=1. Correspondingly, the width of the concentration range CP of the blocking range FA is reduced to a third at 1000 RPM, given a number of pole pairs of NPP=3.

What is claimed is:

1. A machine comprising:
    a rotor,
    a converter-controlled drive with a variable rotational frequency,
    a working machine, wherein the drive and the working machine are connected to one another such that a torque is transmitted,
    a frequency converter which is electrically connected to the drive and converts input frequencies to output frequencies,
    wherein the output frequencies are grouped into a plurality of concentration ranges based upon a rotational speed of the machine,
    wherein each concentration range defines a blocking range, and
    wherein the machine has an operating rotational speed range which lies outside the blocking ranges.

2. The machine as claimed in claim 1, wherein the frequency converter is embodied such that in a Campbell diagram, relating to the machine, intersection points result from
    the natural torsional frequency of the rotor and
    V-shaped symmetrical straight lines of the inter-harmonic exciter frequency for the output frequencies.

3. The machine as claimed in claim 2, wherein each concentration range comprises output frequencies which are close to one another and which respectively have a common output point on the abscissa of the Campbell diagram.

4. The machine as claimed in claim 3, wherein upper and lower limits of each concentration range is defined by an intersection point of
    a lowest and/or second lowest and/or third lowest natural torsional frequency of the rotor and
    two straight lines of a pair of the inter-harmonics of the first order of the concentration range.

5. The machine as claimed in claim 1, wherein the drive comprises a plurality of pole pairs which, together with a motor feeding frequency range, define the operating rotational speed range which lies outside the blocking ranges.

6. The machine as claimed in claim 1, wherein a transmission for transmitting the rotational speed of the drive to a rotational speed of the working machine acts between the drive and the working machine.

7. The machine as claimed in claim 6, wherein the rotational speed of the working machine is higher than the rotational speed of the drive.

8. The machine as claimed in claim 1, wherein the frequency converter is a current intermediate-circuit converter.

9. The machine as claimed in claim 1, wherein the frequency converter is a voltage converter.

10. The machine as claimed in claim 1, wherein the drive is a synchronous motor.

11. The machine as claimed in claim 1, wherein the drive is an asynchronous motor.

12. The machine as claimed in claim 1, wherein a maximum absorption capacity of the drive is at least one megawatt.

13. The machine as claimed in claim 1, wherein the working machine is a turbo-machine.

14. The machine as claimed in claim 1, wherein the working machine is a turbo compressor.

15. A method of operating a machine with a rotor, comprising:
- providing a converter-controlled drive with a variable rotational frequency and a working machine,
- connecting the drive and the working machine such that a torque is transmitted,
- connecting electrically a frequency converter to the drive, wherein the converter converts input frequencies to output frequencies,
- wherein the output frequencies are grouped into a plurality of concentration ranges based upon a rotational speed of the machine,
- wherein each concentration range defines a blocking range, and
- wherein the machine has an operating rotational speed range which lies outside the blocking ranges.

* * * * *